Figure 1:
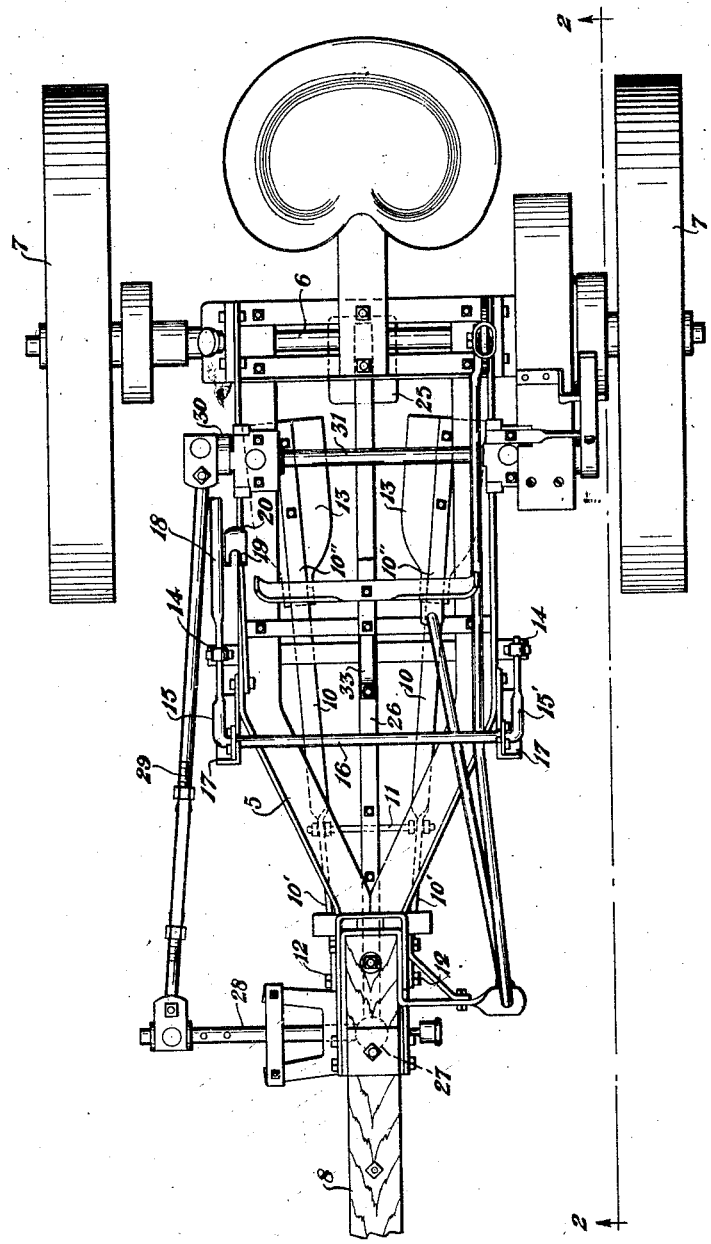

Nov. 6, 1928.

J. L. PARKS 1,690,751

COTTON CHOPPER

Filed April 20, 1928     3 Sheets-Sheet 1

Inventor
Joseph L. Parks, Deceased
By J. L. Parks, Jr., Administrator
By Harry Frease
Attorney Nov. 6, 1928.

J. L. PARKS 1,690,751

COTTON CHOPPER

Filed April 20, 1928

3 Sheets-Sheet 3

Inventor
Joseph L. Parks, Deceased
By J. L. Parks, Jr., Administrator.
By Harry Frease
Attorney Patented Nov. 6, 1928.

1,690,751

UNITED STATES PATENT OFFICE.

JOSEPH L. PARKS, DECEASED, LATE OF HENDERSON, NORTH CAROLINA, BY JOHN L. PARKS, JR., ADMINISTRATOR, OF HENDERSON, NORTH CAROLINA.

COTTON CHOPPER.

Application filed April 20, 1928. Serial No. 271,541.

The invention relates to cotton chopping machines, and more particularly to an improvement in the cotton chopper set forth in Letters Patent No. 1,570,277, issued to him on January 19, 1926.

It is customary to plant cotton seed by sowing it in continuous parallel rows, so as to obtain a sufficient stand or growth for producing a satisfactory crop; and after the stalks have grown several inches in height it has been found necessary to cut them out at spaced intervals, so as to leave two or three or more stalks standing in hills approximately from eight to fourteen inches apart, to give sufficient room for the stalks in each hill to mature.

In this operation, commonly known as cotton "chopping", it is desirable, if not necessary, to cut or scalp the ground at a depth of about half an inch for stalks from one to two inches high, or a depth of about one inch for stalks from three to four inches high; because if the cutting or scalping is too shallow, the plants will not be cut away and may grow again, and if the cut or scalp is too deep, the remaining stalks will be covered by loose dirt thrown by the chopping blade and may not mature.

For these reasons, an absolute control of the depth of the cutting or scalping operation is practically necessary, and the object of the present improvement is to provide means for automatically controlling the cutting depth of the chopping blade in local depressions, as well as local elevations of the soil.

The arrangement of a supplemental frame with guide shoes thereon, and a chopping blade having an arm adapted to automatically raise the chopping blade, for properly cutting through surface elevations, as set forth in said Patent No. 1,570,277, has been very successfully used in soft and sandy soils, because the weight of the chopping blade and its trailing arm is sufficient to depress it for properly cutting through surface depressions in the soil; but when working in harder and tougher soils, it has been found necessary to supply means for positively depressing the chopping blade for properly cutting through surface depressions in the soil.

This difficulty is overcome by the present invention, in which interengaging means are provided between the supplemental frame and the arm of the chopping blade, so as to positively coordinate the downward as well as the upward movements of the same; such means being illustrated in a preferred embodiment of the invention illustrated in the accompanying drawings forming part hereof, in which—

Figure 2:
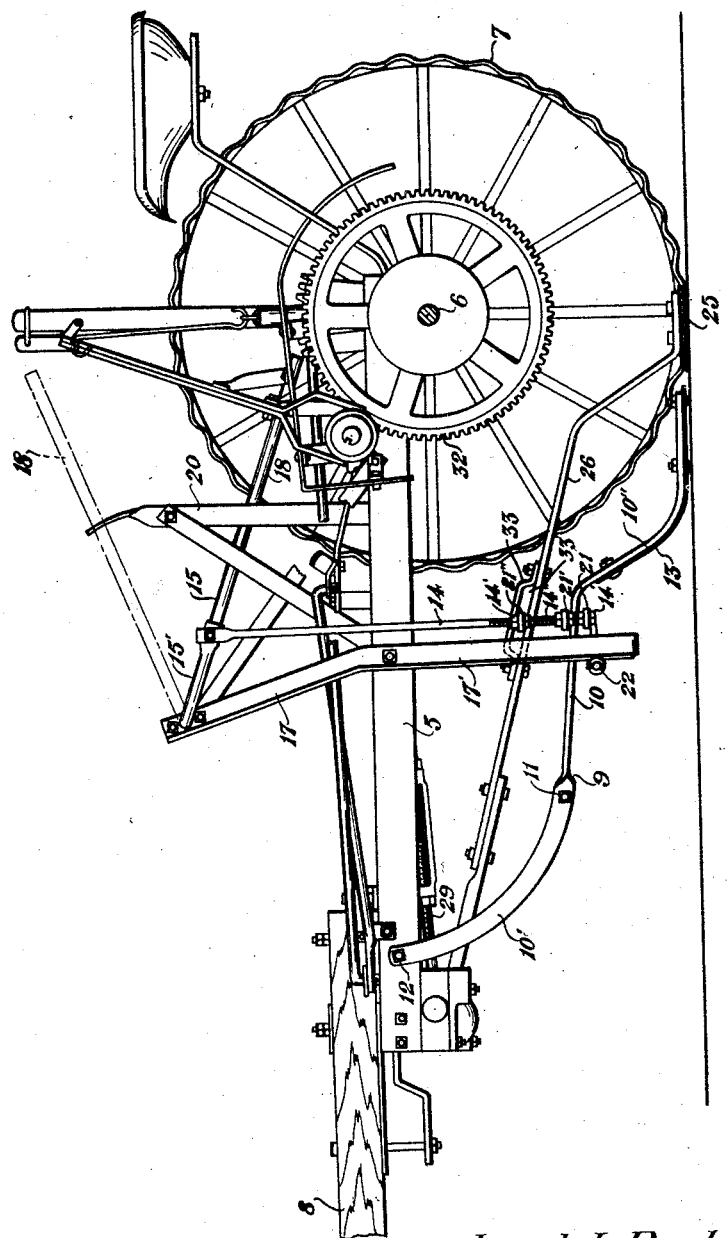
Figure 3:
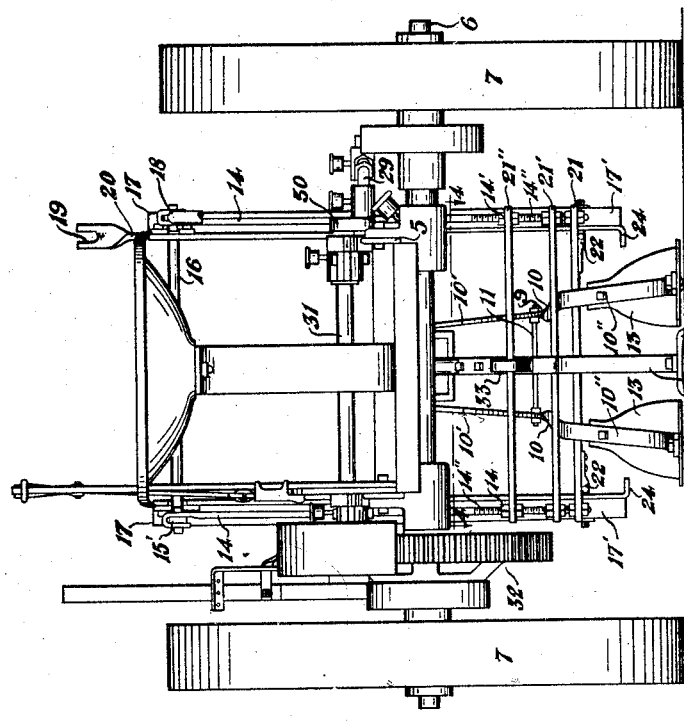

Figure 1 is a plan view of the improved cotton chopper;

Fig. 2, a side elevation of the same with the near wheel removed;

Fig. 3, a rear end elevation of the machine; and

Figure 4:
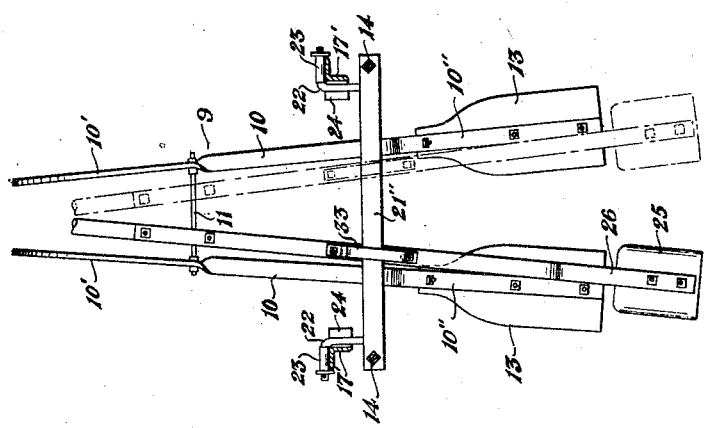

Fig. 4, a fragmentary plan showing the lateral operation of the chopping blade.

Similar numerals refer to similar parts throughout the drawings.

The main frame 5 includes an axle 6 at the rear end with traction wheels 7 secured thereon, and a pole or tongue 8 at the forward end for drawing and guiding the machine. The supplemental frame 9 may include side bars 10 connected by a cross bar 11, and having their forward ends 10' curved upward to a pivotal connection at 12 with the forward end of the main frame.

The rear ends 10" of the supplemental frame are bent downward and then curved rearward and upon their lower sides are secured the trailing guide shoes 13, which are preferably formed flat with their forward ends curved upward, so as to trail upon the ground as runners for automatically raising and lowering the supplemental frame upon its forward end pivotal connection, when passing over surface elevations and into surface depressions of the soil.

A controlling frame, which may be used for raising and supporting the supplemental frame freely above the ground, when the machine is not in operation, may include pendent side rods 14 pivoted at their upper ends to cranks 15 and 15' on the ends of a rock shaft 16 journaled in upright supports 17 secured to the sides of the main frame 5.

The crank 15 on one side of the machine is extended rearward and has a handle 18 by which the controlling frame may be lifted; and by engaging this handle in a notch 19 on the upper end of an upright post 20 secured to the side of the main frame, as shown by dotted lines in Fig. 2, the supplemental or trailing frame may be held in raised position.

A plurality of connecting cross bars 21, 21' and 21'' are adjustably secured upon the lower ends of the pendent rods 14, as by means of nuts 14' turning upon screw threads 14'' on the lower ends of the rods. The two lower cross bars 21 and 21' are adjusted, the one immediately above and the other immediately below the side bars 10 of the trailing frame, so that the controlling frame and the trailing frame will both rise and fall together.

These cross bars also form a laterally extending slot in which the side bars of the trailing frame may move laterally, within the limits of the flexibility of the forward ends of the side bars and the play of their pivotal connection at 12 with the main frame. This limited lateral movement of the trailing shoes 13 permits them to accommodate a trailing action, so as to follow quite closely the sides of a row of cotton stalks.

L-shaped fingers 22 are secured to and extend forward from the lower cross bar 21, and rollers 23 are preferably provided on the L portion of these fingers for bearing against the forward side of the roller depending extensions 17' of the upright support 17, which extensions form tracks for holding the controlling frame from moving rearward when moving upward and downward. An inturned flange 24 is preferably provided on the lower ends of the pendent bars 17', which flanges serve as stops for the L fingers for preventing the trailing frame from dropping downward too far when passing over a very deep surface depression or pit in the ground.

The cotton chopping blade 25 is secured upon the rear end of the long bar or arm 26, which arm extends upward and forward immediately below the cross bar 21'' to a universal joint connection at 27 with the forward end of the main frame. This connection may be a ball and socket joint as shown in detail in said former Patent No. 1,570,277, and may have a lateral arm 28 pivotally connected with a forward end of a pitman 29 having a pivotal connection at its rear end with a crank 30 on the countershaft 31 operatively connected by the gearing 32 with the axle 6, for oscillating the cutting blade laterally in the manner described more fully in said former patent.

An elongated loop is formed by a short longitudinal bar 33 secured on the upper side of the chopping arm 26 immediately over the cross bar 21'', which bar extends through the slot 33' formed by the loop; so that the chopping arm may swing freely during its lateral oscillations but will be carried both upward and downward by a raising and lowering of the trailing frame through the controlling frame associated therewith.

By these means the upward and downward movements of the trailing frame caused by the trailing of the guide shoes upon the surface of the ground along the sides of a row of cotton stalks, will automatically raise and lower the chopping blade so as to positively coordinate its vertical movements both upward and downward, and thereby automatically regulate the depth of the cutting or scalping action of the chopping blade.

It will be understood that in the operation of the machine, the location of the chopping blade immediately in the rear of and free from the depth regulating shoes, not only permits a wide lateral oscillation of the chopping blade in rear of the depth regulating shoes trailing closely along the sides of a row of cotton stalks; but also insures that the chopping blade will be raised upward before entering a surface elevation of the soil, and will be depressed downward before entering a surface depression of the soil, thereby automatically regulating by mechanical means the depth of the cutting or scalping action of the chopping blade, according to the adjustment of the cross bars in the controlling frame.

What is claimed is:

1. A cotton chopper comprising a wheel frame, a trailing frame pivotally connected at its forward end to the wheel frame for vertical movements, depth regulating shoes carried by the trailing frame at the rear of the machine, an elongated arm connected by a universal joint at its forward end with the forward end of the wheel frame, a chopping blade secured to and trailing at the rear end of said arm, means for oscillating the chopping blade transversely, and means coordinating the vertical movements of the chopping blade with the vertical movements of the trailing frame.

2. A cotton chopper comprising a wheel frame, a trailing frame pivotally connected at its forward end to the wheel frame for vertical movements, depth regulating shoes carried by the trailing frame at the rear of the machine, an elongated arm connected by a universal joint at its forward end with the forward end of the wheel frame, a chopping blade secured to and trailing at the rear end of said arm, means for oscillating the chopping blade transversely, and adjustable means coordinating the vertical movements of the chopping blade with the vertical movements of the trailing frame.

3. A cotton chopper comprising a wheel frame, a trailing frame pivotally connected at its forward end to the wheel frame, and adapted for vertical movements, depth regulating shoes carried by the rear end of the trailing frame, a chopping blade trailing in rear of the depth regulating shoes and having an independent forward pivotal connection with the main frame, means coordinating the vertical movements of the chopping blade with the vertical movements of the trailing frame, and means for operating the chopping blade.

4. A cotton chopper comprising a wheel frame, a trailing frame pivotally connected at its forward end to the wheel frame, and adapted for vertical movements, depth regulating shoes carried by the rear end of the trailing frame, a chopping blade trailing in rear of the depth regulating shoes and having a forward pivotal connection with the main frame, means coordinating the vertical movements of the chopping blade with the vertical movements of the trailing frame, and means for operating the chopping blade.

JOHN L. PARKS, Jr.,
*Administrator of the Estate of Joseph S. Parks, Deceased.*